Aug. 7, 1934.  A. A. HODGKINS  1,969,462
PNEUMATIC CLUTCH ACTUATOR
Filed Nov. 8, 1932  3 Sheets-Sheet 1
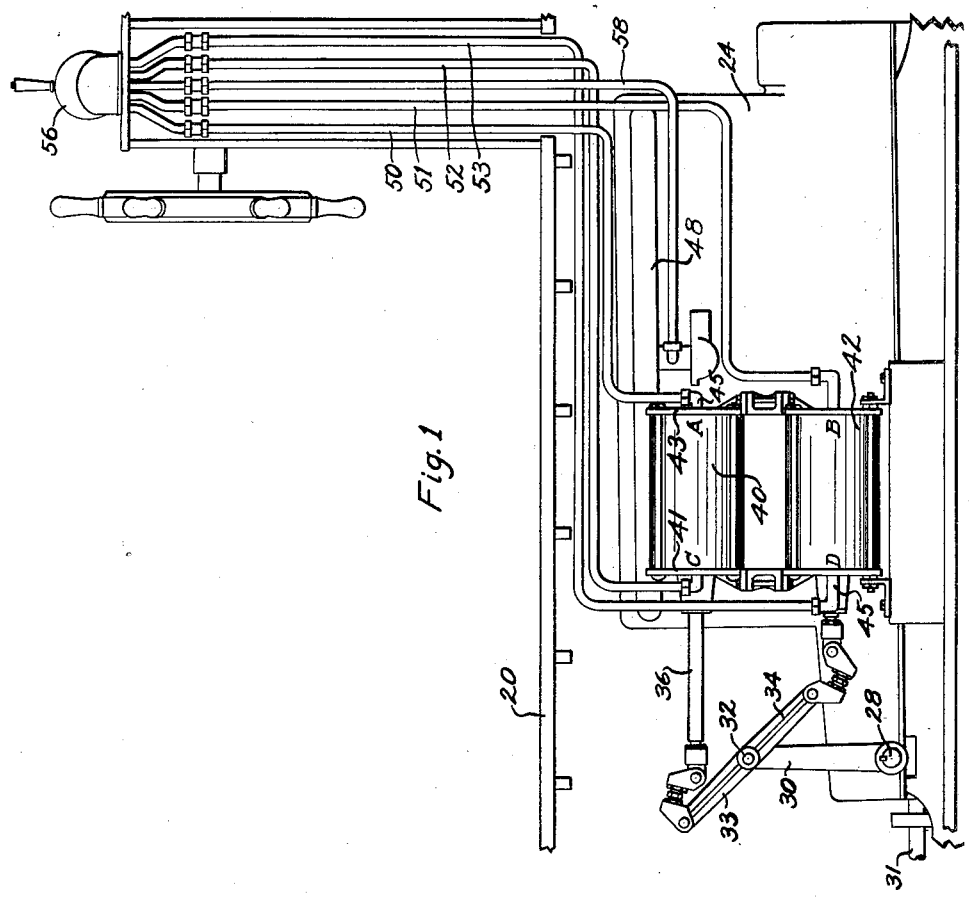
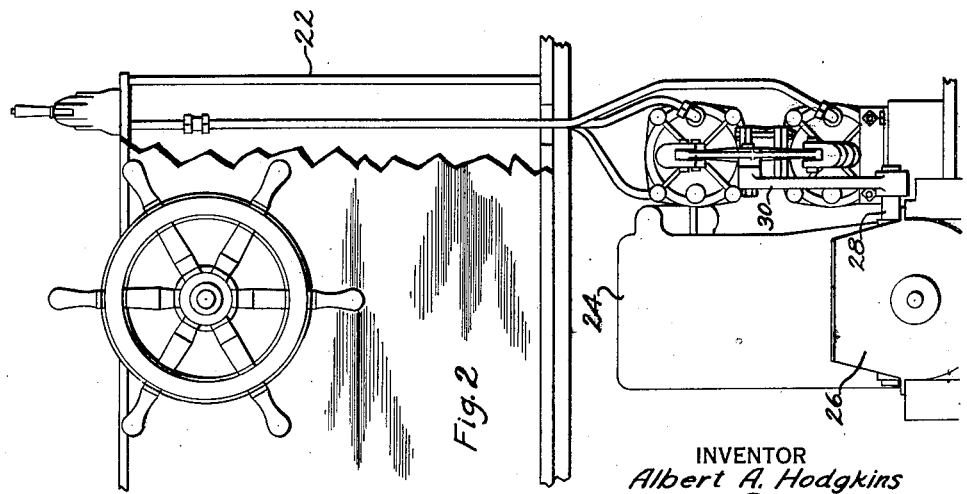
INVENTOR
*Albert A. Hodgkins*
BY
*Frederick Griswold Jr.*
ATTORNEY Aug. 7, 1934.    A. A. HODGKINS    1,969,462
PNEUMATIC CLUTCH ACTUATOR
Filed Nov. 8, 1932    3 Sheets-Sheet 2
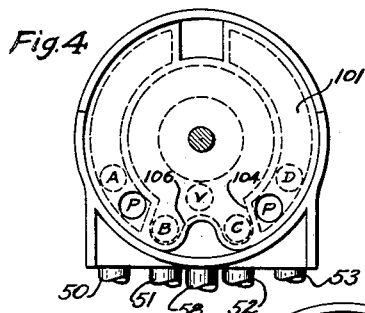
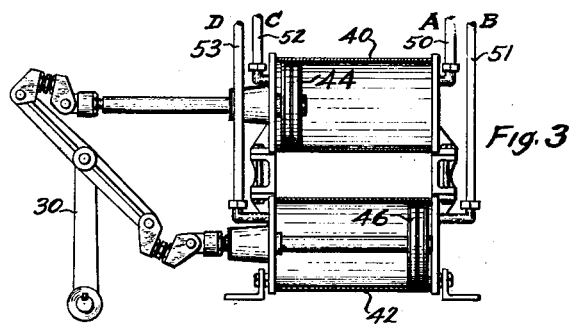
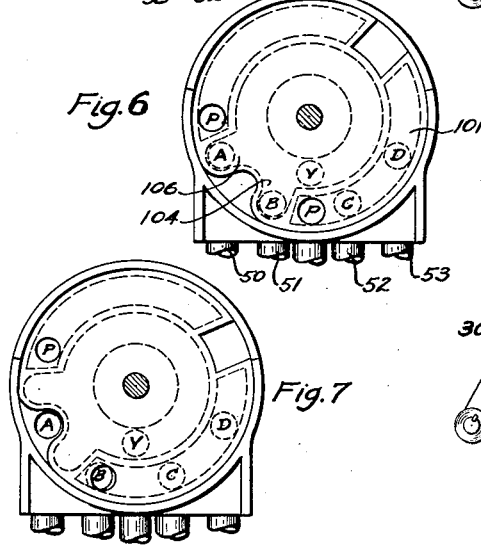
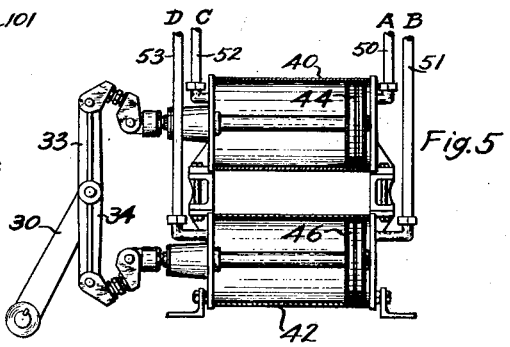
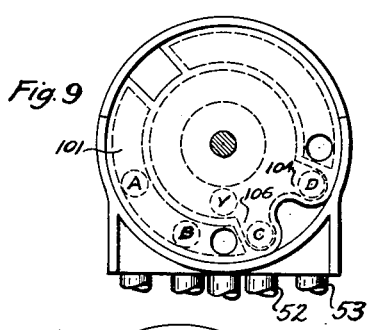
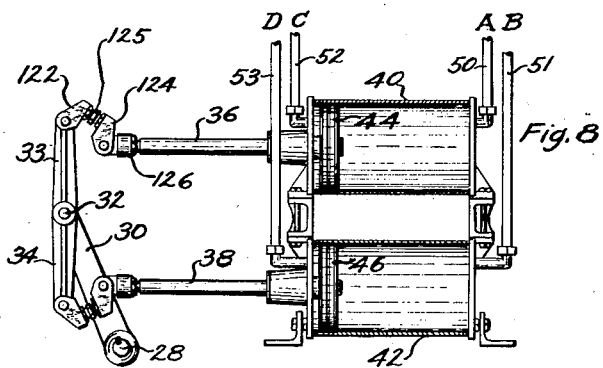
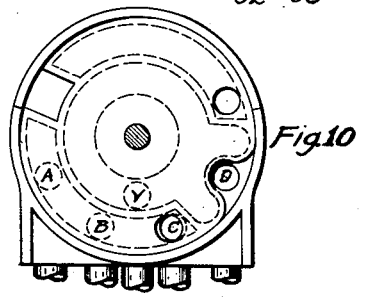
INVENTOR
Albert A. Hodgkins
BY Frederick Griswold Jr.
ATTORNEY Aug. 7, 1934.   A. A. HODGKINS   1,969,462
PNEUMATIC CLUTCH ACTUATOR
Filed Nov. 8, 1932   3 Sheets-Sheet 3
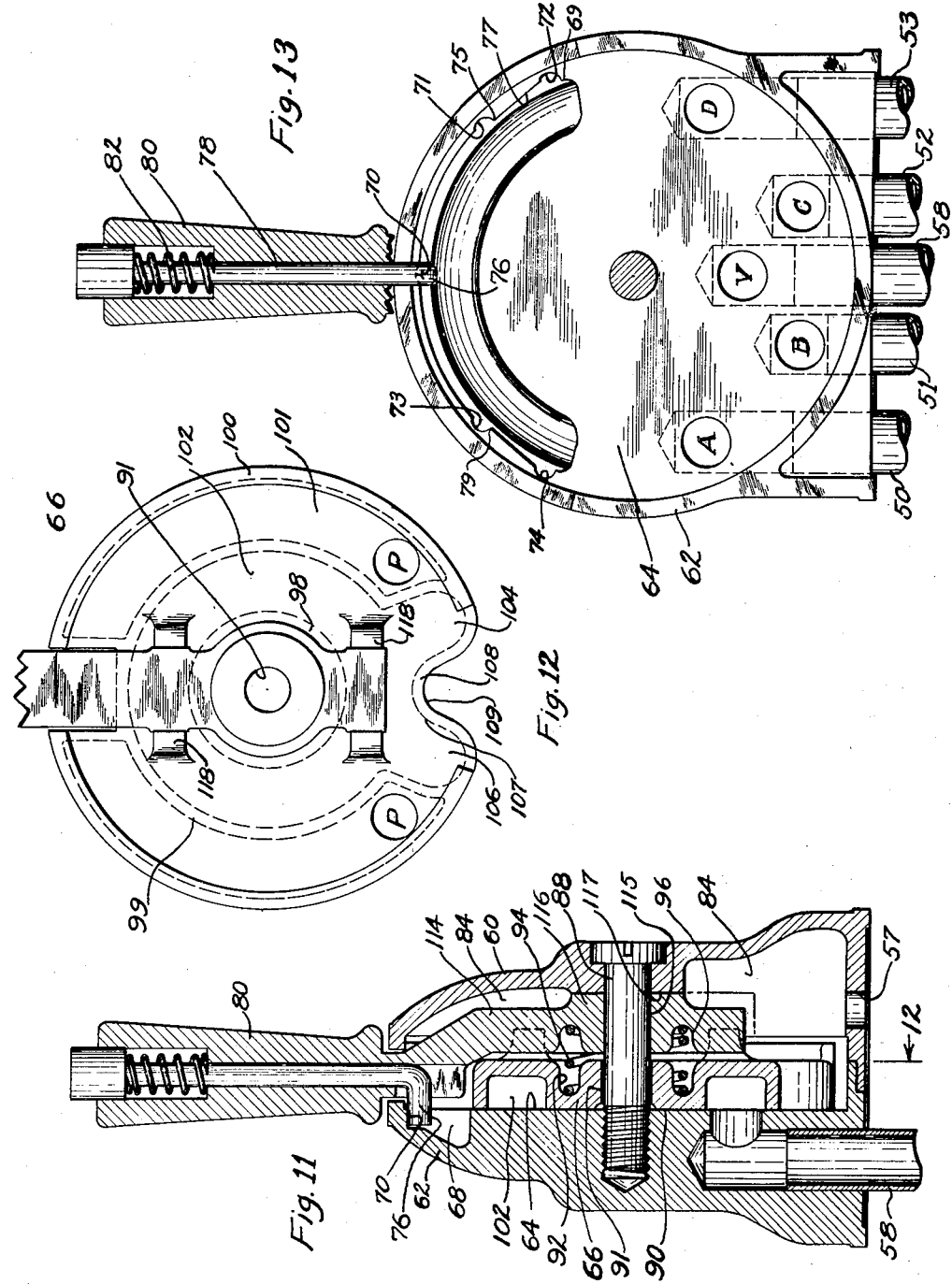
INVENTOR
*Albert A. Hodgkins*
BY
*Frederick Griswold Jr.*
ATTORNEY Patented Aug. 7, 1934

1,969,462

UNITED STATES PATENT OFFICE 1,969,462

PNEUMATIC CLUTCH ACTUATOR

Albert A. Hodgkins, Leonia, N. J., assignor to Almarc, Inc., New York, N. Y., a corporation of New York Application November 8, 1932, Serial No. 641,699

8 Claims. (Cl. 121—38)

This invention relates broadly to the selective performance of shifting movements and more particularly to the control of reverse gearing of the kind commonly used in marine propulsion.

In the operation of so-called reverse gearing as used, for instance, with marine engines, a lever or other movable member is adapted to shift a clutch into a given position, for example, whereby the propeller shaft is rotated in the direction to propel the boat ahead or in reverse. It has heretofore been proposed to effect these shifting movements by a pneumatic motor connected, at the will of the operator, to a source of sub-atmospheric pressure, such as the intake manifold of an internal combustion engine, but mechanical means have been required in addition to the pneumatic means to effectively perform all of the shifting movements.

The primary object of the present invention is to provide means for actuating a movable shifting member, particularly for systems of marine propulsion, which shall be wholly pneumatic.

Accordingly, opposite faces of the movable wall of one or more pneumatic motors are adapted to be selectively placed in communication with a source of sub-atmospheric pressure and atmosphere which, by movement of the wall in opposite directions, effects the shifting movements.

In many situations, in boats, the engine is located beneath the deck while the steering wheel and control stand is on the bridge deck. It has heretofore been proposed to control the reverse gear from such a remote point, but where mechanical connections have been provided, these have offered resistance to the movement of the control lever because of their weight and because of the friction between the moving parts and, therefore, the shifting of the control lever has been accomplished with some difficulty. Moreover, the use of mechanical connections for this purpose has been disadvantageous and has had limitations. The manually actuated parts thereof cannot always be placed at a convenient point on the deck because of the necessity of disposing them in more or less of a direct line.

Another object of the present invention is to provide a controlling device for the pneumatic means performing the shifting movements which permits of remote control of the reverse gear from any convenient point on, say, the bridge deck. The pressure of this shifting member upon an element operatively associated with the clutch, such as a clutch collar, after the shifting movement has been performed and after the said clutch element commences to rotate with the engine driven shaft, results in considerable friction and damage to the contacting parts.

This invention also seeks to provide a reverse gear clutch actuating device whereby the clutch of a marine reverse gear may be positively and effectively moved to engaged position and then released to eliminate friction between the parts. To this end, provision is made for equalizing the pressure on both faces of the pneumatic motor after the propeller shaft has commenced to rotate in the desired direction.

Still another object of the invention is a pneumatic shifting device employing a plurality of pneumatic motors wherein the effect of more than one of said motors may be automatically combined in the performance of a shifting movement.

It is also an object of the invention to provide a control device for systems of marine propulsion which is practical from the standpoint of ease and simplicity of installation and use.

These and other objects of the invention and the means for their attainment will be more apparent from the following detailed description, taken in connection with the accompanying drawings illustrating a preferred embodiment by which the invention may be realized, and in which:

Figure 1 is a view in side elevation showing fragmentary parts of a boat and the prime mover thereof, to which the present invention is applied;

Figure 2 is a view showing the disclosure of Figure 1 in end elevation;

Figure 3 is a view showing the pneumatic motors, shifting member and operative connections therebetween in accordance with this invention;

Figure 4 is a somewhat diagrammatic view of a selector valve controlling the communicating connections between a source of sub-atmospheric pressure and the pneumatic motor when in neutral position;

Figure 5 is a view similar to Figure 3 but showing the position of the motors and shifting member in "ahead" position;

Figure 6 is a view of the valve in "ahead" position;

Figure 7 is a view showing the valve in position to cut off the source of sub-atmospheric pressure from the pneumatic motors after the shifting movement to "ahead" position has been performed in order to relieve the force applied to the shifting member;

Figure 8 is a view similar to Figures 3 and 5 but showing the shifting member in reverse position;

Figure 9 is a view showing the valve in reverse position;

Figure 10 is a view showing the valve in cut-off position after reverse position;

Figure 11 is a view in transverse, vertical section and on an enlarged scale, showing the details of the valve of Figures 4, 6, 7, 9 and 10;

Figure 12 is a view showing the movable member of the valve in elevation and taken in the plane indicated by the broken line 12—12 of Figure 11 and looking in the direction of the arrows, the handle being broken away; and Figure 13 is a view showing that portion of the valve casing on the right of Figure 11 looking from within and showing latching means for the valve handle and the communicating connections with the motors and the source of sub-atmospheric pressure.

In the drawings, the deck of a boat is indicated at 20, a control stand at 22 on which the steering wheel is carried and beneath the deck 20 is shown the prime mover 24, as an internal combustion engine. The engine 24 is provided with a housing 26 within which is disposed any convenient reverse gear mechanism, whereby the driven propeller shaft 31 is driven in the desired direction of rotation from the power shaft or the crank shaft rotated by the prime mover. Projecting from this housing is a rock shaft 28 on which is fixed an arm 30. This arm 30 is illustrative of any movable member performing a shifting movement having two operative positions and a neutral position therebetween.

In the illustrated embodiment, the shifting lever 30 has a neutral position (its vertical position as shown) and when the arm is rocked in one position from this direction, such as, for instance, to the right as shown in Figure 1, the propeller shaft 31 will be turned in a direction, say, to drive the boat ahead, and when moved from the neutral position, say, to the left, the direction of the propeller shaft is reversed.

To the upper or free end of the arm 30 is pivotally mounted, at its midpoint 32, a lever 33, 34, which lever is connected at its respective ends to the piston rods 36, 38 of a pair of power cylinders 40 and 42. While any desired type of motor may be used, it is preferred to use pneumatic motors of the displacement piston type as shown particularly in Figures 3, 5 and 8 where the pistons 44 and 46 are movable within the respective cylinders between the ends thereof. In order to effect the movement of the pistons 44 and 46, it is proposed to selectively open each cylinder to sub-atmospheric pressure upon one side of the piston and admit atmospheric pressure to the opposite side, thus causing a movement of the piston in the desired direction. Obviously, any source of sub-atmospheric pressure may be utilized and, in fact, the invention may be realized with any fluid pressures differing in magnitude. In the illustrated embodiment, advantage is taken of the sub-atmospheric pressure in the intake manifold 48 of engine 24 as the source of sub-atmospheric pressure. Accordingly, the opposed cylinder heads 41 and 43 are each provided with an outlet fitting 45 to which communicating connections, shown as the respective pipes 50, 51, 52 and 53, lead to a selector valve 56 mounted, for convenience, say, on the control stand 22 adjacent the steering wheel of the boat. Also leading to the selector valve 56 is a communicating connection 58 from the intake manifold 48. The selector valve also has a vent 57 to atmosphere as will hereinafter be explained, whereby when one side of one piston is subjected to the sub-atmospheric pressure of the intake manifold, the other side of the piston may be open to atmosphere to effect a movement of the piston and thereby a movement of the gear shift lever in the desired direction. As a matter of convenience, the selector valve may be so placed that its handle will be movable in a plane lying in the fore and aft direction of the boat so that movement of the handle ahead will result in changing the gear for movement "ahead" and movement of the handle toward the stern will result in the reverse rotation of the propeller.

Let it now be assumed that the gear shifting lever 30 is standing in the neutral position illustrated in Figure 3. In order that it may assume this position, shown as upright, the piston 44 is in the extreme left hand or rear end of the cylinder 40 and the piston 46 is in the extreme right hand or forward end of the cylinder 42, as shown in Figure 3. Vacuum has, therefore, been applied through the pipe 52 to the left hand side of the piston 44 and atmospheric pressure has been applied through the pipe 50 to the right hand face of the piston, thus having caused the piston to move to the position indicated. Similarly, the right hand or forward face of piston 46 has been subjected to the sub-atmospheric pressure of the intake manifold through the pipe 51 and atmospheric pressure has been admitted to the rear face of that piston through the pipe 53.

If now it is desired to move the shifting lever 30 to "ahead" position, it is rotated in a clockwise position as viewed in Figure 5. This is accomplished by permitting the piston 46 to remain in its forward position and drawing the upper end 33 of the lever 33—34 toward the right by the piston 44. This is accomplished by moving the selector valve 56 as will hereinafter be explained so that the pipe 50 is in communication with the intake manifold and the pipe 52 is open to atmosphere. Atmospheric pressure, therefore, upon the left hand face of piston 44 will move that piston to the right drawing with it the end 33 of the lever 33, 34 to the position shown in Figure 5, and since the lower end 34 of this lever remains stationary by reason of the fact that the piston 46 does not move, the lever 33, 34 is fulcrumed about its lower end thereby drawing the movable shift lever 30 in a clockwise direction to the position shown in Figure 5.

If it is desired to reverse the direction of rotation of the propeller shaft 31, the shift lever 30 is rotated through neutral in a counter-clockwise direction to the position shown in Figure 8. Pipes 52 and 53 are connected through the selector valve 56 with the intake manifold of the engine and atmospheric air is admitted through the pipes 50 and 51. This atmospheric pressure on the right hand faces of both pistons 44 and 46 move both pistons to the left until they reach the left hand ends of both cylinders, when the lever 33, 34 will be in the vertical position shown and the shift lever 30 will have been moved to the rear. Because of the fact that the fulcrum 32 of lever 33, 34 will travel in an arc about the shaft 28, the movement of the two pistons 44 and 46 will be somewhat irregular and the lever 33, 34 will lie in various angles to the vertical during this movement but because of the fact that fluid pressure is utilized as the motive fluid, the pistons are enabled to accommodate themselves in their movements to this movement of the lever 33, 34 and the force exerted by both pistons will, at the same time, combine so that a total force is applied to the lever 30 to move it to the position desired and which is the sum of the forces exerted by each piston while it is moving to and after it has passed the neutral position.

The selector valve 56 illustrated in Figures 11, 12 and 13 is substantially cylindrical and, for convenience in manufacture, is formed of two halves 60 and 62 separated by a plane parallel to the plane of movement of the handle. The part 62 has a plane inner face 64. It is formed with inlet passages entering from below which receive the respective pipes 50, 51, 52 and 53. These passages turn at right angle and form ports A, B, C and D, these ports being preferably circular for convenience in manufacture with their centers lying in a circle concentric with the axis of rotation of the movable valve member 66. The casing part 62 is also formed with a passage opening through the face 64, as the vacuum port V, at a lesser radial distance than the ports A, B, C and D. This passage receives the end of the pipe 58 leading to the intake manifold 48 of the engine. The face of the casing part 62 is also formed with an arcuate latching groove 68, the upper surface of which is provided with a plurality of notches or latching recesses 70, 71, 72, 73 and 74 adapted to receive the latching detent 76.

The locking detent is carried on the end of a plunger 78 reciprocating through the valve handle 80 and protruding through the end thereof. The detent 76 is urged against the face of the groove 68 and normally seeks a seat in the latching recesses by a coil spring 82. These latching recesses facilitate the positioning of the valve member in register with desired ports as will hereinafter be described. The latching recess 70 is relatively shallow so that as the handle 80 is moved in either direction, the latching detent 76 may easily ride out of the recess without necessitating depression of the plunger 78, the spring 82 readily yielding to the slight extent necessary. The "forward" latching recess 71 is also shallow, that is to say, its depth relative to the side from which the latching detent 76 approaches from neutral position is of substantially the same depth as the neutral latching recess 70. The opposite side of the latching recess 71, however, is relatively higher to form a shoulder 75 against which the latching detent 76 abuts. Thus when the handle 80 is moved forward, the detent naturally seeks the "forward" recess 71 and the handle cannot be pushed past that "forward" position without conscious and intended depression, by the operator, of the plunger 78. Locking recess 72, which is at the "ahead" vacuum cut-off position of the valve, is also relatively shallow and on the side approached by the locking detent, the wall 77 of the groove 68 is inclined between the shoulder 75 and the latching recess 72. If desired, the latching recess 72 may have on its side remote from the neutral position of the handle an abutment 69 limiting the forward movement of the handle.

The other end of the arcuate latching groove 68, on the side opposite of the neutral latching recess 70, is the same as that already discussed, that is, the "reverse" latching recess 73 is formed with a shoulder 79 against which the latching detent 76 abuts while the side of the recess 73 toward neutral position is relatively low to permit the latching detent to easily ride out of the recess. While the function of these latching recesses will be described more in detail hereinafter, it may be pointed out that the handle 80 is free to move out of the "forward" latching recess 71 to the "reverse" latching recess 73 in the simplest manner and without involving the actuation of the latching detent plunger 78, whereas the positioning of the valve for forward or reverse speeds is definitely fixed and automatically accomplished by abutment against the respective shoulders 75 and 79. However, to cut off the cylinders after the boat is under way in the desired direction, forward or reverse, conscious effort on the part of the operator is required to release the detent and move the handle past these shoulders 75 and 79 to the desired "cut-off" recess 72 or 74 as the case may be.

The latching recesses 70, 71, 72, 73 and 74 thus form indexing means for the movable valve member corresponding to its several necessary positions.

The companion casing part 60 is hollowed out or recessed to provide a vent passage 84, which is in communication with atmosphere through the vent passage 57 in the bottom of the valve casing.

The two casing parts 60 and 62 are secured together in any convenient fashion, preferably by a screw 88 threaded into the casing part 62 at the center of the face 64. This screw thus serves as an axle about which the valve member 66 and the valve handle 80 turn.

The valve member 66 is of disc-like form and also has a grooved plane face 90 bearing against the face 64 of the casing part 62. It is centrally apertured, as at 91, to receive the pin 88 and rotate thereabout. On the side opposite the face 90 it is formed with an annular spring groove 92 to receive one end of a coil spring 94, the other end of which is seated in a similar spring groove 96 in the lower end 116 of the handle 80. The spring 94 serves to yieldingly hold the valve member 66 against the face 64, thereby forming a tight seal between the surfaces 64 and 90.

As shown in Figure 12, the face 90 of the valve disc is formed by a central boss 98 concentric with the hole 91, a peripheral flange 100 and a flange 99 intermediate the boss 98 and peripheral flange 100. The flange 99 defines, with the boss 98, a circular vacuum passage 102. In the lower part of the valve disc, the vacuum passage 102 opens into a pair of spaced vacuum chambers or recesses 104 and 106 which extend outwardly to the peripheral flange 100 and are formed by curving the peripheral flange 100 inwardly, as at 108, so that the disc is cut out at this point to form a passage 109 completely therethrough. The flange 99 is curved outwardly, at 107, in spaced relation to the inwardly curving flange portion 109 to meet the periphery to form these chambers. The passage 101 in the valve member, between the flange 100 and the flange 99, is a bleed passage adapted to register with selected ports A, B, C and D as the movable valve member or disc 66 is adjusted to different positions. In the lower ends of the bleed passage are formed, respectively, atmospheric air pressure inlet ports P. Thus, the three pressure ports or passages 109, P and P are adapted to register with selected ports A, B, C and D to admit atmospheric pressure to these ports while the recesses 104 and 106 disposed therebetween, register with other of the ports A, B, C and D to connect such ports with the vacuum port V with which the channel 102 is in register.

The handle 80 is a separate member adapted to actuate or move the valve member 66 to selected positions. The handle as a whole has a downwardly extending portion 114 offset from the axis of the handle part 80, which terminates in the apertured cylindrical end 116 formed with the groove 96 hereinbefore discussed. The aperture 115 receives the screw 88 and is thus free to rotate thereabout. The bearing portion 116 abuts against a bearing surface 117 formed on the casing part 60. In order that the valve disc 66 may be turned with the handle 80, it is provided upon opposite sides of the center with spaced abutments 118 between which the handle 114 is disposed so that movement of the handle carries with it the valve member.

From an understanding of the operation of the invention, reference will now be had to Figures 3 through 13.

*Neutral*

It is assumed that the gear is in neutral and the gear shift lever 30 in the vertical position shown in Figure 3. At this time, the handle 80 is also in the vertical position shown in Figure 13 and the latching detent 78 is in the "neutral" shallow latching recess 70. The valve disc 66 is now in the position shown in Figure 4, at which time the recess 106 registers with the port B communicating through pipe 51 with the forward end of cylinder 42 and the chamber 104 registers with the port C, communicating through pipe 52 with the rear end of cylinder 40. The bleed passage 101 is in communication with port D communicating through pipe 53 with the rear end of cylinder 42 and with port A communicating through pipe 50 with the forward end of cylinder 40 and opening those ends of the respective cylinders to atmospheric pressure, while the chambers 104 and 106 open the other ends of the respective cylinders to the vacuum of the intake manifold of the engine through vacuum port V communicating through pipe 58 with the intake manifold of the engine. Thus the rear face of piston 44 and the front face of piston 46 are subjected to the sub-atmospheric pressure of the intake manifold while the forward face of piston 44 and the rear face of piston 46 are subjected to atmospheric pressure through the vent passage 101. Therefore, the pistons 44 and 46 have assumed the positions illustrated in Figure 3.

*Ahead*

If now it is desired that the boat move ahead, the handle 80 is moved in a clockwise direction, as viewed in Figure 13, i. e., toward the bow of the boat until the latching detent 76 registers with the forward latching recess 71. The neutral locking recess is shallow so that the detent may easily ride out of the recess without the necessity of depressing the plunger 78. The forward side of latching recess 71 is higher as a shoulder 120, which serves as an abutment with which the latching detent 76, engages a stop positioning the valve in position for "forward" speed. The valve member 66 is thus moved from the position shown in Figure 4 to the position shown in Figure 6 wherein the vacuum chamber 106 is in register with the vacuum port A communicating through pipe 50 with the forward end of cylinder 40. Vacuum chamber 104 is similarly in register with the port B communicating through pipe 51 with the forward end of cylinder 42. The vent passage 101 at this time is in communication with ports C and D, thereby admitting atmospheric pressure through pipes 52 and 53 to the rearward faces of pistons 44 and 46 while the forward faces of both pistons are subjected to the sub-atmospheric pressure of the intake manifold. Thereby is the piston 44 caused to move by atmospheric pressure to the forward end of the cylinder thus drawing the arm 33 in a forward direction until the lever 33, 34 is vertical and the shift lever 30 is moved through an angle in a clockwise direction to the position shown in Figure 5.

In some situations and because of the fact, among others, that the fulcrum 32 moves in an arcuate direction, the piston 46 will be drawn, during this movement, slightly toward the rear until the lever 33—34 has swung around to a vertical position. Then, however, both pistons will tend to move the lever in a movement of translation directly forward while maintaining it vertical. Thus both pistons apply an equal force to the arm 30 which is the sum of the forces exerted by each piston and thus double the force is applied in shifting the lever 30 than would be applied by the atmospheric pressure acting on a single piston.

*Ahead cut-off*

After the clutch in the transmission has been engaged, it is desirable to relieve the pressure of the clutch actuating lever on the clutch collar as otherwise damage will result to the coacting parts, as the collar rotates. To relieve this pressure, the motors are deenergized by equalizing the pressure on the respective faces of the pistons in the following manner: After the pilot has moved the handle 80 forward until the latching detent 76 abuts against the shoulder 75 and after the boat is moving ahead, the pilot depresses the plunger 78 to bring the detent 76 below the shoulder 75 and then moves the handle 80 further ahead until the detent abuts against the stop 69 and the detent engages in the "ahead cut-off" latching recess 72. This movement of the handle 80 causes a movement through a corresponding angle of the valve disc 66 to the position shown in Figure 7 in which pressure chamber 109 is in register with the port A and the pressure passage 101 is in register with the ports B, C and D, thus bleeding both faces of both pistons to atmosphere and equalizing the pressure thereon. At this time also the vacuum port V is out of communication with the cylinders as will be clearly apparent.

*Reverse*

If, now, it is desired to move the boat astern, the rotation of the propeller shaft is reversed by moving the shifting lever 30 in a counter-clockwise direction, as viewed in Figure 1, to the position shown in Figure 8. This is accomplished by moving the handle 80 in the counter-clockwise direction shown in Figure 13 or to the rear until it abuts against the shoulder 79 and lies in the latching recess 73. It will be observed that the movement of the latching detent 76 out of the latching recess 72 is facilitated by reason of the fact that the corner 119 of that recess is relatively low and the wall 77 between recess 72 and 71 is inclined upwardly. Furthermore, recesses 71 and 70 are relatively shallow and offer no obstruction to the free movement of the handle from "ahead cut-off" position into reverse position and without necessitating the additional operation of depressing the latching plunger 78.

Movement of the handle to reverse position moves the valve disc 66 to the position shown in Figure 9, wherein chambers 106, 104 are in register with ports C and D thereby opening the rear faces of the pistons 46 and 44 to the sub-atmospheric pressure of the intake manifold through the vacuum port V. At the same time, ports A and B are opened to the atmosphere through the vent channel 101 thereby admitting atmospheric pressure to the forward faces of the pistons 44 and 46. These pistons are thereby moved from the position shown in Figure 5 to the position shown in Figure 8, forcing the lever 33, 34 rearwardly and thereby drawing the shift arm 30 to the rear.

*Reverse cut-off*

Here again, after the boat commences to move astern, it is desirable to relieve the pressure on the clutch collar as before explained. To this end, the pilot depresses the plunger 78 to move the latching detent 66 out of the recess 73 and below the shoulder 79 and moves the handle further to the rear until the latching detent 76 abuts the shoulder or stop 67, at that end of the latching groove 68. Thereby is the valve disc 66 rotated to the position shown in Figure 10 at which time the vacuum port V is cut off from all of the ports and the ports B, C and D are all in communication with the bleed channel 101, port A communicating with the bleed passage 84 through passage 109, thereby as previously explained, equalizing the pressure upon both sides of the respective pistons and relieving the pressure on the clutch collar.

It will be noted that the latching recess 74 is of substantially the same shape as the latching recess 72 so that when it is desired to move the boat forwardly, the handle 80 may be readily moved forward without the necessity of depressing the latching plunger 78.

The free movement of the valve between "ahead" and "reverse" positions is essential in case of emergency and it is equally essential that accidental movement of the valve be prevented to either of the "cut-off" positions except by the conscious effort of the pilot.

Obviously the piston rods 36 and 38 must be connected to the respective ends of the lever 33, 34 by a lost motion connection because the fulcrum of lever 33, 34 travels in an arc and if the bed on which the power cylinder structure rests is exactly level and the shift lever 30, in neutral position, is exactly perpendicular, the necessary connections may be made without difficulty. However, in order to facilitate the installation of the apparatus despite slight inequalities in levels and distances, it is desirable to provide adjustments between the respective ends of the lever 33, 34 and the piston rods 36 and 38 so that misalignments and differences in center to center dimensions may be compensated for. To this end, an adjustable member or link comprising a connection functioning in the manner of a turnbuckle is pivotally connected to the respective ends of the cylinder rods and lever and the connection of each of these adjusting members with the piston rods is preferably of a pivoting nature to permit of adjustment and accommodation, as desired. As shown, each end of lever 33, 34 has an arm 122 pivotally connected therewith. Each piston rod (36 and 38) also has an arm 124 pivotally mounted thereon. The free ends of these arms 122 and 124 are apertured and threaded in opposite directions to receive an adjusting bolt 125 which may be rotated to lengthen or shorten the distance between the arms. The pivotal connection of the arms 124 with the piston rods may be a swivelling connection as shown at 126.

It will thus be seen that a gear shift mechanism particularly for marine use has been provided wherein all mechanical power means is avoided and fluid pressure is the sole force used. The fluid motors may be disposed at any convenient point outside the engine while the selector lever may similarly be disposed wherever desired on the boat for remote control.

Various modifications will occur to those skilled in the art in the configuration and disposition of the component elements going to make up the invention as a whole as well as in the selection and combination of certain of the elements to accomplish certain of the results, and no limitation is intended by the phraseology of the foregoing specification or illustrations in the accompanying drawings, except as indicated in the appended claims.

What is claimed is:—

1. In a system of propulsion wherein a power shaft is driven by a prime mover and drives a driven shaft through a transmission comprising clutch means actuated by a movable member, the combination with sources of differing fluid pressure, of two fluid pressure cylinders, oppositely acting pistons movable in said cylinders and having a piston rod respectively, a lever pivotally connected intermediate its ends to said movable member and at its ends to the respective piston rods, a valve movable to connect predetermined faces of said pistons to fluid pressure of one degree and to apply fluid pressure of a different degree to predetermined faces of said pistons to apply force to the movable member and said valve being movable to another position to apply fluid pressure of the same degree to both faces of each piston to relieve the force applied to the movable member and thereby to the clutch means.

2. In a system of propulsion wherein a power shaft is driven by a prime mover and drives a driven shaft through a transmission comprising clutch means actuated by a movable member, the combination with sources of differing fluid pressure, of two fluid pressure cylinders, a movable piston in each cylinder having a piston rod, a lever pivotally connected intermediate its ends to said movable member and at its ends to the respective piston rods, a valve movable in a predetermined direction to connect predetermined faces of said pistons to fluid pressure of one degree and to apply fluid pressure of a different degree to predetermined faces of said pistons to apply force to the movable member and to cause engagement of the clutch means and movable in the same direction to apply fluid pressure of the same degree to both faces of each piston to relieve the force applied to the movable member and thereby to the clutch means.

3. In a selector valve for a pneumatic system having at least two pneumatic motors adapted to be connected with a shifting member, in combination, a casing provided with a pair of spaced motor ports adapted to be connected with each pneumatic motor, a vacuum port in communication with a source of sub-atmospheric pressure and a vent port, a valve member rotatable therein and formed with a vacuum passage and vent passages, said vacuum passage being adapted to simultaneously register with the vacuum port and two of the motor ports and the vent passages being adapted to register with the remaining motor ports and the vent port and means to move the valve member in opposite directions to selectively connect a motor port of each cylinder with the vacuum port by the vacuum passage and the other motor port of each cylinder with the vent port by the vent passages and further in the same direction to connect both motor ports of each cylinder with the vent port by the vent passages.

4. In a selector valve for a pneumatic system having pneumatic motor means adapted to be connected with a shifting member wherein spaced motor ports in groups of two are adapted to be connected with said pneumatic motor means, a vacuum port in communication with a source of sub-atmospheric pressure and a vent port, the combination with a valve member movable in opposite directions and formed with vacuum and vent passages adapted to connect the vacuum port with selected motor ports and the remaining motor ports with the vent port, of a handle to move said valve member in opposite directions from a central neutral position to an intermediate position to selectively connect a motor port of each group with the vacuum port and the other motor port of each group with the vent port and further in the same direction to an extreme position to connect all of said motor ports with the vent port and latching means comprising a spring pressed detent carried with the handle and detent receiving recesses adapted to locate said valve at each position, the recesses at the neutral and intermediate positions being formed to permit the detent to move between said positions upon manipulation of the handle and means to prevent movement of the detent to either extreme position except upon manipulation of the detent.

5. In a selector valve for a pneumatic system having pneumatic motor means adapted to be connected with a shifting member wherein spaced motor ports in groups of two are adapted to be connected with said pneumatic motor means, a vacuum port in communication with a source of sub-atmospheric pressure and a vent port, the combination with a valve member movable in opposite directions and formed with vacuum and vent passages adapted to connect the vacuum port with selected motor ports and the remaining motor ports with the vent port, of a handle to move said valve member in opposite directions from a central neutral position to an intermediate position to selectively connect a motor port of each group with the vacuum port and the other motor port of each group with the vent port and further in the same direction to an extreme position to connect all of said motor ports with the vent port and latching means comprising a spring pressed detent carried with the handle and detent receiving recesses adapted to locate said valve at each position, the recess at the neutral position having walls of equal height and the recesses at the intermediate positions having walls, respectively, on the side toward the neutral recess of the same height, to permit the detent to move between said positions upon manipulation of the handle, the walls of the intermediate recesses on the side toward the extreme recesses being of such height as to prevent movement of the detent to either extreme position except upon manipulation of the detent.

6. A selector valve for a pneumatic system wherein two pneumatic motors perform shifting movement, comprising, in combination, opposed casing parts, one of said parts being formed with spaced motor ports in groups of two adapted to be connected to the pneumatic motors and disposed at substantially equal distances from a common center, a vent port communicating with atmosphere and a vacuum port adapted to be connected with a source of sub-atmospheric pressure disposed at a lesser radial distance, a movable valve member rotatable about said common center and formed with a circular channel in register with the vent port and having two spaced chambers communicating with the channel and adapted to register with any two adjacent motor ports, in predetermined positions of the valve member, said valve member being also formed with passages communicating with the vent port to atmosphere and spaced by said chambers and at a radial distance to register with the other motor ports in said predetermined positions of the valve member and with all of said motor ports in other predetermined positions of the valve member.

7. A selector valve for a pneumatic system wherein two pneumatic motors perform shifting movements, comprising, in combination, opposed casing parts, one of said parts being formed with spaced motor ports in groups of two adapted to be connected to the pneumatic motors and disposed at substantially equal distances from a common center, a vent port communicating with atmosphere, a vacuum port adapted to be connected with a source of sub-atmospheric pressure disposed at a lesser radial distance, a movable valve member rotatable about said common center and formed with a circular channel in register with the second named port and having two spaced chambers communicating with the channel and adapted to register with two adjacent motor ports, said valve member being also formed with spaced passages adapted to register with other of said motor ports and communicating with the vent port to atmosphere, an arcuate groove formed in said valve casing, a handle to move the valve member, a manually released spring actuated latching detent carried with the handle and lying in the groove, said groove being formed with latching recesses to receive the detent corresponding to neutral, ahead and reverse positions and latching recesses to receive the detent corresponding to cut-off for the reverse and ahead positions.

8. In a selector valve for a system wherein fluid pressure motors perform shifting movements to neutral, ahead and reverse positions, the combination with a casing having ports respectively communicating with the motors and sources of pressure of different magnitudes, of a valve member movable between five positions to selectively connect ports whereby there is applied to the motors differential pressure for neutral, ahead and reverse positions and, subsequently, equalized pressures for the respective ahead and reverse positions, a handle to move said valve between five positions, said casing being formed with an arcuate groove formed with latching recesses, a central one for neutral position, one on either side of the neutral recess for ahead and reverse speeds, respectively, and remote recesses for ahead cut-off and reverse cut-off, respectively, said neutral recess and the sides of the other recesses proximate the neutral recess being shallow to permit the latching detent to ride out of the recesses without manual actuation thereof and the remote sides of the ahead and reverse recesses being formed with stops to prevent the latching detent riding out of the recesses toward the cut-off recesses except by manual actuation of the latching detent and a manually actuated spring pressed latching detent adapted to ride past at least all but one of said positions and manually movable to ride past said one position.

ALBERT A. HODGKINS.